UNITED STATES PATENT OFFICE.

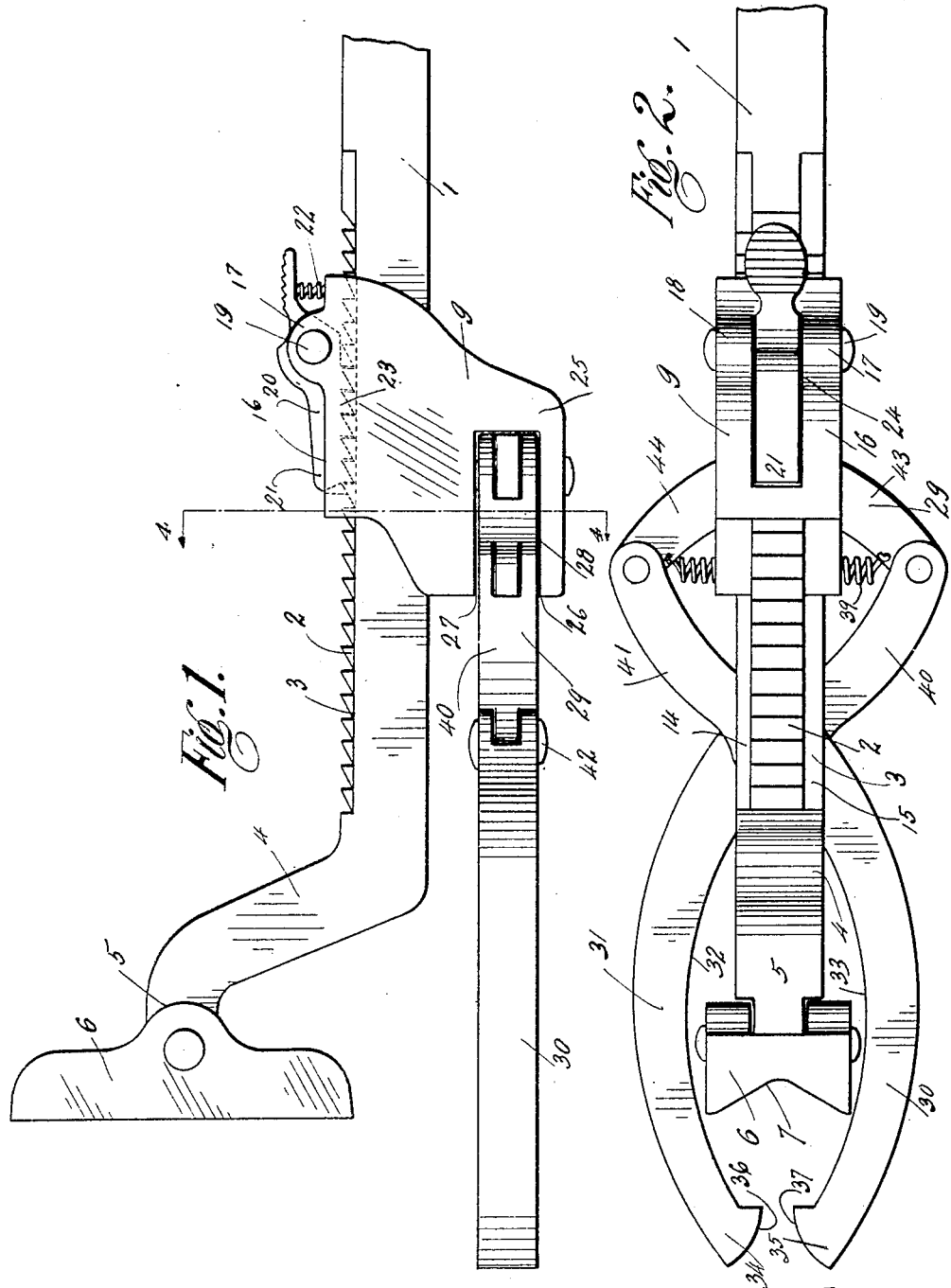

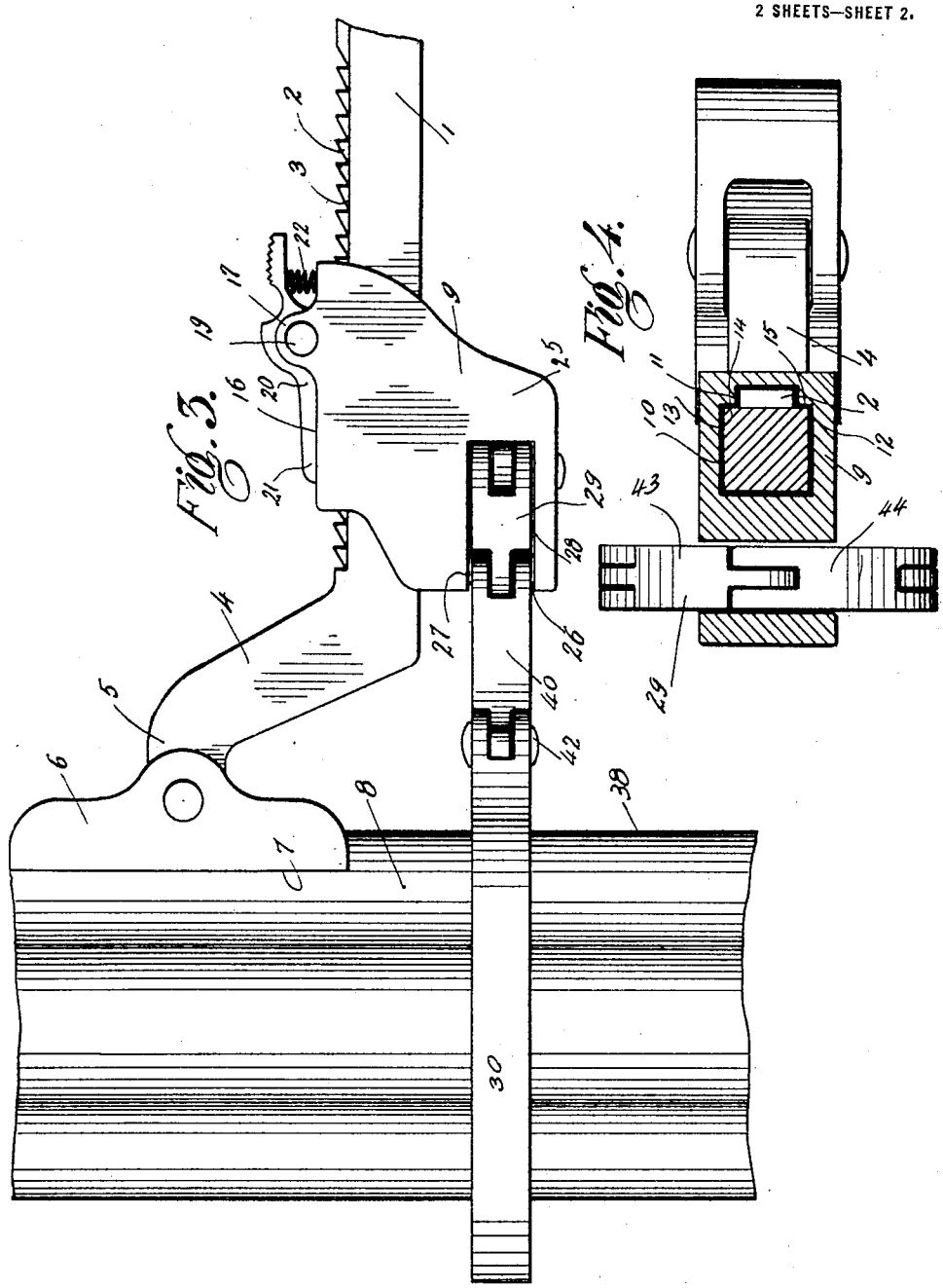

CHARLES G. HALL, FRANCIS A. DEVEREAUX, AND ALBERT R. COBEY, OF INTERNATIONAL FALLS, MINNESOTA.

RADIATOR-CARRIER.

1,396,328.   Specification of Letters Patent.   Patented Nov. 8, 1921.

Application filed April 12, 1920. Serial No. 373,372.

*To all whom it may concern:*

Be it known that I, CHARLES G. HALL, FRANCIS A. DEVEREAUX, and ALBERT R. COBEY, citizens of the United States, residing at International Falls, in the county of Koochiching and State of Minnesota, have invented certain new and useful Improvements in Radiator-Carriers, of which the following is a specification.

This invention relates to a radiator lifting device and has for its object to provide a simple, inexpensive yet efficient tool for lifting radiators to move them from place to place.

Another object of the invention is to provide a self locking radiator tong.

With the above and such other objects in view as may hereinafter more fully appear, we have invented the device illustrated in the accompanying drawings in which—

Figure 1 is an elevational view of our invention,

Fig. 2 is a similar view from another side,

Fig. 3 is another elevational view showing the device attached to a radiator coil, and Fig. 4 is a section on line 4—4, Fig. 1.

Like reference characters indicate like parts throughout the following specification and in the several views in the drawings in which 1 indicates a shank approximately fourteen inches in length, having teeth 2 in its edge 3 and an inclined part 4 terminating in a right angular end 5 parallel with the main shank, to which is pivoted a rocker head 6 having a longitudinal concaved face 7 shaped to seat snugly against a radiator coil 8. Slidably mounted upon the shank 1 is a block 9 having a longitudinal passage 10 through which shank 1 extends. The passage has a reduced part 11 formed by shoulders 12 and 13 to receive the teeth 2. Said shoulders slidably seat in grooves 14 and 15 of the shank whereby the block is held out of engagement with said teeth. The upper wall 16 of block 9 has upstanding spaced apart flanges 17 and 18 forming bearings for the pin 19 upon which the dog 20 is pivotally mounted, said dog having a lever end 21 held normally raised by a spring 22 to keep the teeth 23 of the dog in engagement with the teeth 2 of the shank 1 whereby the block 9 is held against forward movement when in use. A slight pressure of the thumb by the user upon lever 21 will cause the sets of teeth to become disengaged for adjustment of the block 9. Said wall 16 has a cut out 24 through which the toothed side of dog 20 extends to engage teeth 2 of the shank. The lower part 25 of block 9 has a cut out 26, between the walls 27 and 28 of which the tong member 29 is pivotally mounted. This member consists of a pair of bowed jaws 30 and 31 having arcuate inner faces 32 and 33 shaped to the contour of the radiator coil 8, said jaws terminating at their free ends in hooks 34 and 35 for gripping the coil 8. These hooks have opposingly curved faces 36 and 37 whereby the edge 38 of the coil 8 will shove said jaws apart against the tension of spring 39 to allow the jaws to receive said coil. The jaws 30 and 31 have opposingly curved lever extensions 40 and 41, respectively, which are pivotally connected at 42. To the extreme ends of levers 40 and 41 are pivoted arcuate links 43 and 44 which are pivoted together and held operatively secured in the recess 26 by a pin 45. The ends of spring 39 are secured to the inner ends of links 43 and 44, said spring acting to normally draw levers 40 and 41 together causing the crossing jaws 30 and 31 to remain normally closed together in order that they automatically maintain their grip upon a coil 8 when once connecting therewith. The head 6 acts as a fulcrum for the shank causing the block 9 through pin 45 to draw upon links 43 and 44 to augment the action of spring 39 in forcing the jaws 30 and 31 to maintain their grip upon the radiator coil to which it is attached so that the heavier the radiator being lifted the firmer the grip of said jaws. The sliding head 9 permits of adjustment to fit coils of various sizes.

From the above description it will be seen that this radiator lifter will attach itself to a radiator coil when pressed thereagainst and may be readily detached therefrom by pressing the shank 1 toward the tong member whereby the links 43 and 44 will force levers 40 and 41 apart and open jaws 30 and 31 whereupon the device may be released from the radiator. It is obvious that this tool may be used for lifting or manipulating pipes, coils and other articles to which it may be gripped as well as radiators.

Having now described our invention, that which we claim as our invention is recited in the following claims:

1. A radiator lifter consisting of a shank, tongs connected therewith, and a sliding block to which the tongs are connected.

2. A radiator lifter consisting of a shank, tongs connected therewith, a sliding block to which the tongs are connected, and a rocker head on said shank.

3. A radiator lifter consisting of a shank, tongs connected therewith, a sliding block to which the tongs are connected, and a rocker head on said shank, said shank having an offset portion to which the head is pivoted.

4. A radiator lifter consisting of a shank, tongs connected therewith, a sliding block to which the tongs are connected, a rocker head on said shank, said shank having an offset portion to which the head is pivoted, and means for adjusting the block on the shank.

5. A radiator lifter consisting of a shank, tongs connected therewith, a sliding block to which the tongs are connected, a rocker head on said shank, said shank having an offset portion to which the head is pivoted, and means for adjusting the block on the shank, said tongs embracing pivoted jaws shaped to fit a radiator coil.

6. A radiator lifter consisting of a shank, tongs connected therewith, a sliding block to which the tongs are connected, a rocker head on said shank, said shank having an offset portion to which the head is pivoted, means for adjusting the block on the shank, said tongs embracing pivoted jaws shaped to fit a radiator coil, and means whereby the jaws are held normally closed.

7. A radiator lifter consisting of a shank, tongs connected therewith, a sliding block to which the tongs are connected, a rocker head on said shank, said shank having an offset portion to which the head is pivoted, means for adjusting the block on the shank, said tongs embracing pivoted jaws shaped to fit a radiator coil, means whereby the jaws are held normally closed, and means whereby weight applied to the shank will cause the jaws to be more firmly forced together.

8. A radiator lifter consisting of a shank, tongs connected therewith, a sliding block to which the tongs are connected, a rocker head on said shank, said shank having an offset portion to which the head is pivoted, means for adjusting the block on the shank, said tongs embracing pivoted jaws shaped to fit a radiator coil, means whereby the jaws are held normally closed, and means which applied to the shank will cause the jaws to be more firmly forced together, said last means consisting of links pivotally connected to said jaws.

9. A radiator lifter consisting of a shank having tongs connected therewith, a rocker head on said shank, said shank having an offset portion to which the head is pivoted, means for adjusting the block on the shank, said tongs embracing pivoted jaws shaped to fit a radiator coil, means whereby the jaws are held normally closed, and means which applied to the shank will cause the jaws to be more firmly forced together, said last means consisting of links pivotally connected to said jaws, said links being adapted to force said jaws apart.

10. A radiator lifter consisting of a shank having tongs connected therewith, said tongs embracing pivoted jaws shaped to fit a radiator coil, means whereby the jaws are held normally closed, and means which applied to the shank will cause the jaws to be more firmly forced together, said last means consisting of links pivotally connected to said jaws, said links being adapted to force said jaws apart, through certain action of said shank.

11. A lifting device including a pair of tongs the inner contour of which when closed conform to the shape of a radiator coil, a shank and a sliding block connecting the tongs thereto.

12. A lifting device including a pair of tongs the inner contour of which when closed conform to the shape of a radiator coil, a shank and a sliding block connecting the tongs thereto, said tongs being pivotally connected to the block.

13. A lifting device including a pair of tongs the inner contour of which when closed conform to the shape of a radiator coil, a shank and a sliding block connecting the tongs thereto, said tongs being pivotally connected to the block and means for normally holding the tongs closed.

14. A lifting device including a pair of tongs the inner contour of which when closed conform to the shape of a radiator coil, a shank and a sliding block connecting the tongs thereto, said tongs being pivotally connected to the block and means for normally holding the tongs closed, said pivotal connection including a pair of links adapted to force said tongs closed upon a coil when the shank is raised.

15. A lifting device including a pair of tongs the inner contour of which when closed conform to the shape of a radiator coil, a shank and a sliding block connecting the tongs thereto, said tongs being pivotally connected to the block and means for normally holding the tongs closed, said pivotal connection including a pair of links adapted to force said tongs closed upon a coil when the shank is raised, and means for adjustably fixing the block on the shank.

In testimony whereof we affix our signatures in the presence of two witnesses.

CHARLES G. HALL.
FRANCIS A. DEVEREAUX.
ALBERT R. COBEY.

Witnesses:
JOHN JACOB HADLER,
CARL VICTOR LINSTEN.